United States Patent
Fukino

(10) Patent No.: US 9,488,797 B2
(45) Date of Patent: Nov. 8, 2016

(54) LENS BARREL, IMAGE-CAPTURING DEVICE, AND METHOD FOR CONTROLLING LENS BARREL

(71) Applicant: NIKON CORPORATION, Tokyo (JP)

(72) Inventor: Kunihiro Fukino, Fujisawa (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/754,399

(22) Filed: Jun. 29, 2015

(65) Prior Publication Data

US 2015/0301302 A1 Oct. 22, 2015

Related U.S. Application Data

(63) Continuation of application No. 14/123,006, filed as application No. PCT/JP2012/068447 on Jul. 20, 2012, now Pat. No. 9,103,952.

(30) Foreign Application Priority Data

Jul. 20, 2011 (JP) .................................. 2011-158865
Jul. 20, 2011 (JP) .................................. 2011-158866

(51) Int. Cl.
*G02B 7/02* (2006.01)
*G03B 17/00* (2006.01)
(Continued)

(52) U.S. Cl.
CPC ............... *G02B 7/003* (2013.01); *G02B 7/021* (2013.01); *G02B 7/023* (2013.01); *G02B 7/026* (2013.01);
(Continued)

(58) Field of Classification Search
CPC ........ G02B 7/102; G02B 7/003; G02B 7/04; G02B 7/10; G02B 7/021; G02B 7/023; G02B 7/026; G02B 7/1805; G02B 27/646; G02B 15/14; G03B 17/12; G03B 17/00; G03B 3/10; G03B 17/04; G03B 2205/0023; G03B 2205/0053; G03B 2205/0092

USPC ....... 359/813, 819, 822, 823, 825, 555, 556, 359/694–704, 739; 396/55, 72, 79, 351
See application file for complete search history.

(56) References Cited

U.S. PATENT DOCUMENTS 5,166,829 A 11/1992 Iizuka ........................... 359/699
5,717,528 A 2/1998 Ihara et al.
(Continued)

FOREIGN PATENT DOCUMENTS

CN 101813816 8/2010
JP 2000-89086 3/2000
(Continued)

OTHER PUBLICATIONS

International Search Report mailed Oct. 30, 2012, in corresponding International Application No. PCT/JP2012/068447.
(Continued)

*Primary Examiner* — Loha Ben

(57) ABSTRACT

A lens barrel in which tilt adjustment can be made depending on the position of a lens unit in the optical axis direction. This lens barrel includes: at least three guide bars provided so as to extend along the optical axis direction; a driving unit that respectively drives the at least three guide bars in the optical axis direction; a lens frame holding unit that holds an image-capturing lens, the lens frame holding unit being attached to at least three guide bars and being driven in the optical axis direction by the at least three guide bars; and a control unit that controls said at least three linear actuators so as to adjust the respective drive amounts in the optical axis direction of the at least three guide bars and to tilt the lens frame holding unit from a direction orthogonal to the optical axis.

29 Claims, 12 Drawing Sheets

(51) Int. Cl.
G02B 7/00 (2006.01)
G02B 7/10 (2006.01)
G03B 3/10 (2006.01)
G03B 17/12 (2006.01)
G02B 27/64 (2006.01)
G02B 7/04 (2006.01)
G02B 15/14 (2006.01)
G03B 17/04 (2006.01)

(52) U.S. Cl.
CPC . *G02B 7/04* (2013.01); *G02B 7/10* (2013.01); *G02B 7/102* (2013.01); *G02B 27/646* (2013.01); *G03B 3/10* (2013.01); *G03B 17/00* (2013.01); *G03B 17/12* (2013.01); *G02B 15/14* (2013.01); *G03B 17/04* (2013.01); *G03B 2205/0023* (2013.01); *G03B 2205/0053* (2013.01)

(56) References Cited

U.S. PATENT DOCUMENTS

| | | | |
|---|---|---|---|
| 6,008,954 A | 12/1999 | Shintani et al. | 359/704 |
| 6,507,705 B1 | 1/2003 | Kasha | 396/72 |
| 7,035,019 B2* | 4/2006 | Sakamoto | G02B 7/021 348/357 |
| 7,465,107 B2* | 12/2008 | Washisu | G02B 7/1805 348/E5.03 |
| 7,656,073 B2 | 2/2010 | Doshida et al. | 310/330 |
| 7,990,626 B2 | 8/2011 | Fukino | |
| 8,300,334 B2 | 10/2012 | Takahashi | 359/825 |
| 8,482,871 B2 | 7/2013 | Fukino | 359/823 |
| 8,483,556 B2 | 7/2013 | Okuda | 396/79 |
| 8,743,472 B2* | 6/2014 | Ouchi | G02B 7/023 359/694 |
| 2005/0280908 A1 | 12/2005 | Tanaka | |
| 2010/0220403 A1 | 9/2010 | Fukino | |
| 2011/0101826 A1 | 5/2011 | Shiraki et al. | |
| 2011/0273782 A1 | 11/2011 | Fukino et al. | 359/701 |
| 2013/0308204 A1 | 11/2013 | Fukino et al. | 359/701 |
| 2015/0022900 A1 | 1/2015 | Fukino et al. | 359/684 |

FOREIGN PATENT DOCUMENTS

| | | |
|---|---|---|
| JP | 2003-50343 | 2/2003 |
| JP | 2003-57517 | 2/2003 |
| JP | 2006-3837 | 1/2006 |
| JP | 2006-235287 | 9/2006 |
| JP | 2008-107533 | 5/2008 |
| JP | 2010-197898 | 9/2010 |
| JP | 2011-95446 | 5/2011 |
| JP | 2011-107336 | 6/2011 |

OTHER PUBLICATIONS

Notice of Allowance mailed from the United States Patent and Trademark Office on Mar. 31, 2015 in the related U.S. Appl. No. 14/123,006.
U.S. Appl. No. 14/123,006, filed Feb. 18, 2014, Kunihiro Fukino, Nikon Corporation.
Japanese Office Action dated Oct. 27, 2015 in corresponding Japanese Patent Application No. 2013-525706.
Chinese Office Action dated Aug. 18, 2015 in corresponding Chinese Patent Application No. 201280026059.7.

* cited by examiner

FIG. 2
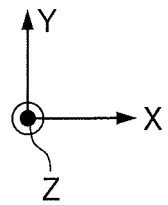
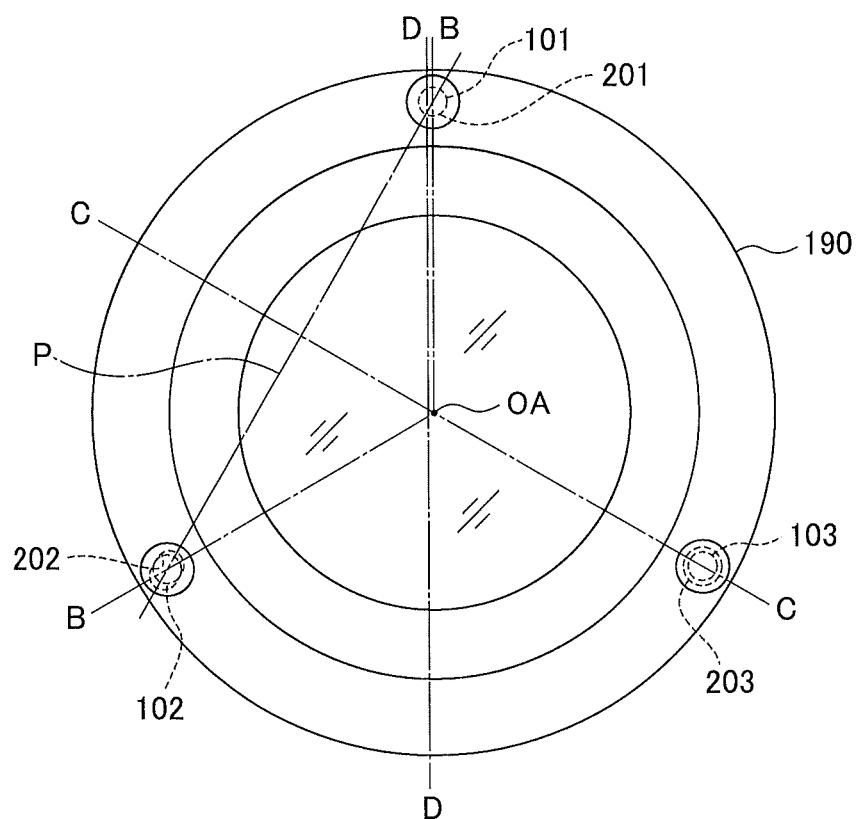

FIG. 6
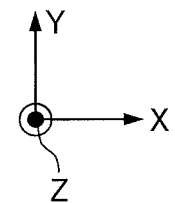
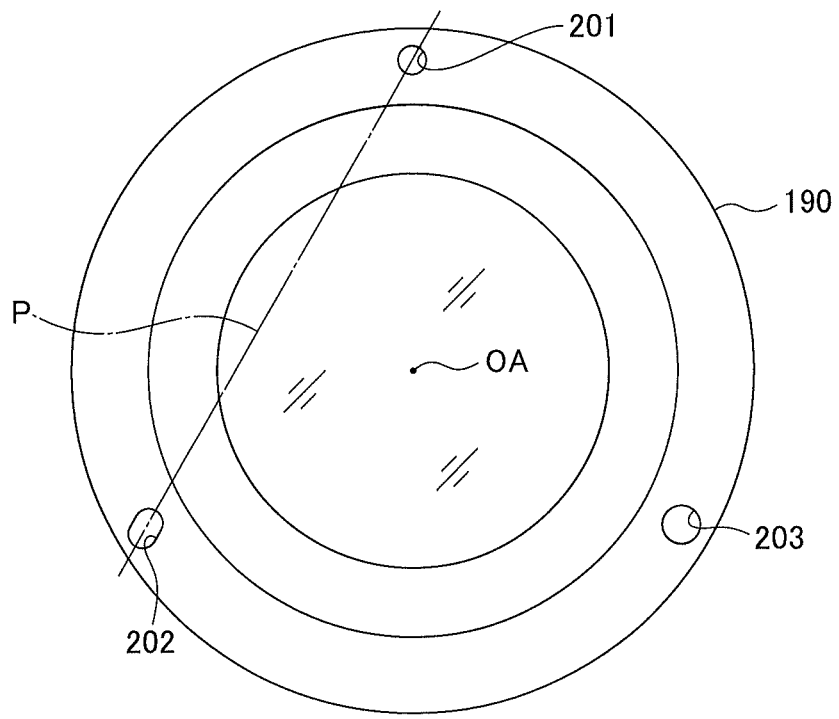

FIG. 12
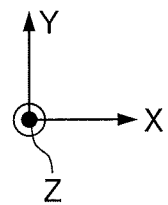
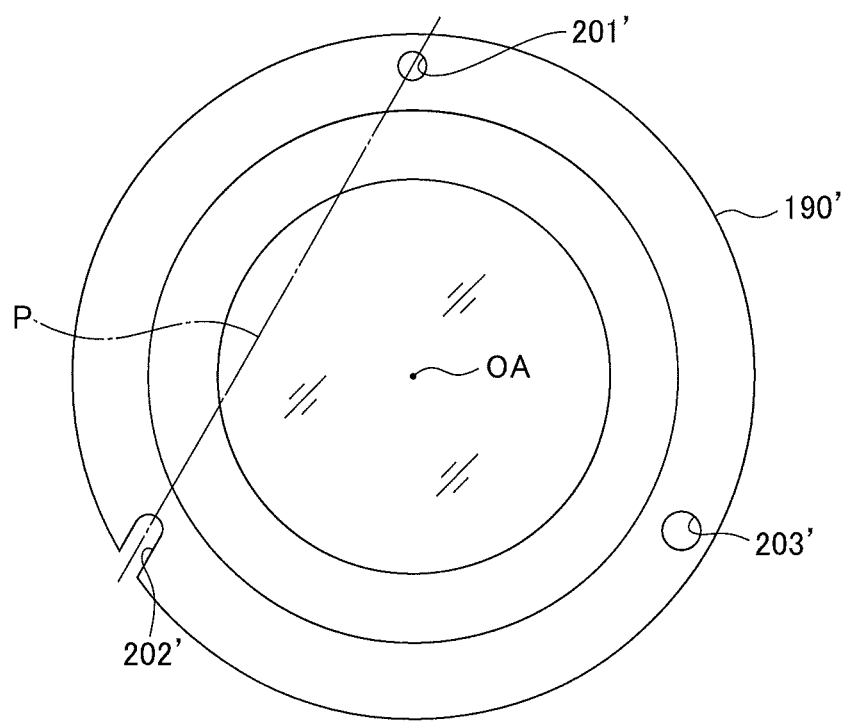

LENS BARREL, IMAGE-CAPTURING DEVICE, AND METHOD FOR CONTROLLING LENS BARREL

CROSS-REFERENCE TO RELATED APPLICATIONS

This application is a U.S. continuation application filed under 37 C.F.R. 1.53(b) claiming priority benefit of U.S. application Ser. No. 14/123,006, filed Feb. 18, 2014, allowed. Application Ser. No. 14/123,006 further claimed the benefit, under 35 U.S.C. Section 371, of PCT International Application No. PCT/JP2012/068447, filed Jul. 20, 2012, which claimed foreign priority benefit to Japanese Application No. 2011-158865, filed Jul. 20, 2011 and Japanese Application No. 2011-158866, filed Jul. 20, 2011 in the Japanese Patent Office, the disclosures of which are hereby incorporated by reference.

BACKGROUND

1. Field

The present invention relates to a lens barrel, an image-capturing device, and a method for controlling the lens barrel.

2. Description of Related Art

A lens barrel generally includes a plurality of lenses (lens units). In these lens units, an optical axis of the lens may be tilted with respect to an optical axis of the lens barrel due to assembling errors or the like.

Conventionally, when lenses are assembled, in order to adjust such a tilt of a lens (that is, to perform tilt adjustment), a washer having an appropriate width is inserted between a lens frame and a lens holding frame that holds the lens frame (see Patent Document 1).

Moreover, an internal focusing zoom lens that changes a focal position of an optical system by changing the distance between a plurality of lenses to change the magnification of the optical system to move an intermediate lens of the optical system is known (see Patent Document 2).

[Patent Document 1] Japanese Unexamined Patent Application, Publication No. 2006-03837

[Patent Document 2] Japanese Unexamined Patent Application, Publication No. 2000-89086

SUMMARY

According to the adjustment method disclosed in Patent Document 1, the tilt is not changed after tilt adjustment is performed before shipping. However, the tilt direction may be different depending on the position of the lens in the optical axis direction.

Moreover, in Patent Document 2, when the intermediate lens is driven by three guide bars, the guide bar may be constrained redundantly.

An object of the present invention is to provide a lens barrel, an image-capturing device and a method for controlling the lens barrel in which tilt adjustment can be made depending on the position of a lens in an optical axis direction.

Another object of the present invention is to provide a lens barrel and an image-capturing device capable of stably holding a lens frame.

Means for Solving the Problems

The present invention solves the problems by the following means. For better understanding, although embodiments of the present invention are described with corresponding constituent components designated by corresponding reference numerals, the present invention is not limited to this.

According to a first aspect of the present invention, there is provided a lens barrel including: three guide bars provided so as to extend in an optical axis direction; three actuators that drive the three guide bars in the optical axis direction, respectively; a lens frame that holds an image-capturing lens and that is attached to the three guide bars and driven in the optical axis direction by the three guide bars; and a control unit that adjusts driving amounts of the three guide bars in the optical axis direction and controls the three linear actuators so that the lens frame is tilted from a direction orthogonal to the optical axis.

In the first aspect, the lens barrel may further include: a fixing unit that holds the three guide bars so as to be movable in the optical axis direction; and a position detecting device that detects positions in the optical axis direction of the three guide bars in relation to the fixing unit, wherein the control unit may be configured to detect a position and the tilt of the lens frame in relation to the fixing unit from the positions of the three guide bars detected by the position detecting device.

In the first aspect, three openings corresponding to the respective guide bars may be formed in the lens frame, a body portion having a larger diameter than the corresponding opening and a small-diameter portion provided on a side of the body portion closer to a subject and configured to be inserted into the opening may be formed in an end portion of the three guide bars, respectively, a stopper member having a larger diameter than the opening may be attached from outside to the small-diameter portion in a state where the small-diameter portion is inserted into the opening, and a biasing member that biases the lens frame in the optical axis direction may be disposed on an outer circumference of the small-diameter portion.

In the first aspect, a first opening of the three openings and a small-diameter portion inserted into the first opening may be fitted with a minimum necessary gap, a second opening among the three openings may be a U-shaped groove or long hole of which the opening length in a first direction that is vertical to the optical axis and extends toward the first opening is larger than an opening length in a second direction that is vertical to the optical axis and orthogonal to the first direction, and the second opening and a small-diameter portion inserted into the second opening may be fitted with a minimum necessary gap in the second direction, and a third opening and a small-diameter portion inserted into the third opening may have a sufficient gap necessary for avoiding redundant constraint.

In the first aspect, the lens frame may move in the optical axis direction during zooming or focusing.

In the first aspect, the control unit may change the driving amounts of the three guide bars in the optical axis direction and may change a direction and an amount of tilt of the lens frame from a direction orthogonal to the optical axis based on the position of the lens frame in the optical axis direction during zooming or focusing.

In the first aspect, the lens barrel may further include a fixed cylinder that holds the three guide bars so as to be movable in the optical axis direction.

In the first aspect, the three guide bars have different thicknesses.

According to a second aspect of the present invention, there is provided an image-capturing device including the lens barrel.

According to a third aspect of the present invention, there is provided a method for controlling a lens barrel including: three guide bars provided so as to extend in an optical axis direction; three actuators that drive the three guide bars in the optical axis direction, respectively; and a lens frame that holds an image-capturing lens and that is attached to the three guide bars and driven in the optical axis direction by the three guide bars, the method including: adjusting driving amounts of the three guide bars in the optical axis direction and controlling the three linear actuators so that the lens frame is tilted from a direction orthogonal to the optical axis.

According to a fourth aspect of the present invention, there is provided a lens barrel including: first, second, and third guide bars that extend in an optical axis direction and at least one thereof is driven in the optical axis direction by a driving mechanism; and a lens holding unit that holds an image-capturing lens and has first, second, and third openings in which engagement portions of the first, second, and third guide bars are inserted, respectively, wherein the first opening is a fitting hole in which a position of the first guide bar of the lens holding unit is fixed when the engagement portion of the first guide bar is inserted in the first opening, the second opening is a U-shaped groove or long hole of which the opening length in a first direction that is vertical to the optical axis and extends toward the first opening is larger than a diameter of the engagement portion of the second guide bar, and in which a position of the second guide bar in a second direction that is vertical to the optical axis and is vertical to the first direction is fixed, and the third opening is an insertion hole which has a larger diameter than the diameter of the engagement portion of the third guide bar and in which the engagement portion can be inserted even when the third guide bar is shifted within a certain range from the center of the third opening.

According to a fifth aspect of the present invention, there is provided an image-capturing device including the lens barrel.

According to the present invention, it is possible to provide a lens barrel, an image-capturing device and a method for controlling the lens barrel in which optimal tilt adjustment can be made depending on the position of a lens unit in an optical axis direction.

Moreover, it is possible to provide a lens barrel and an image-capturing device capable of avoiding redundant constraint of the guide bar by the lens holding unit.

BRIEF DESCRIPTION OF THE DRAWINGS

FIG. 2 is a diagram illustrating a lens frame of a lens barrel of FIG. 1 when seen from a direction indicated by A-A.

FIGS. 5A through 5C are diagrams illustrating a state where a second lens frame is held by a guide bar, in which FIG. 5A illustrates a holding state of a first guide bar, FIG. 5B illustrates a holding state of a second guide bar, and FIG. 5C illustrates a holding state of a third guide bar.

FIG. 6 is a diagram illustrating only the lens frame of FIG. 2.

FIGS. 11A through 11C are diagrams illustrating a state where a second lens frame is held by a guide bar, in which FIG. 11A illustrates a holding state of a first guide bar, FIG. 11B illustrates a holding state of a second guide bar, and FIG. 11C illustrates a holding state of a third guide bar.

FIG. 12 is a diagram illustrating only the lens frame of FIG. 8.

DESCRIPTION OF EMBODIMENTS

Explanation of Reference Numerals

1: CAMERA
10: CAMERA BODY
100: LENS BARREL
101: FIRST GUIDE BAR
102: SECOND GUIDE BAR
103: THIRD GUIDE BAR
125A, 125A': FIRST LINEAR ACTUATOR
125B, 125B': SECOND LINEAR ACTUATOR
125C, 12CA': THIRD LINEAR ACTUATOR
201, 201': FIRST HOLE
202, 202': HOLE
203, 203': THIRD HOLE
127, 127': POSITION DETECTING UNIT
130: ZOOM RING
133: ZOOM RING ROTATION AMOUNT DETECTING UNIT
190: LENS FRAME
L1, L2, L3, L4, L5: LENS
OA: OPTICAL AXIS

Hereinafter, embodiments of the present invention will be described with reference to the drawings and the like.

Figure 1:
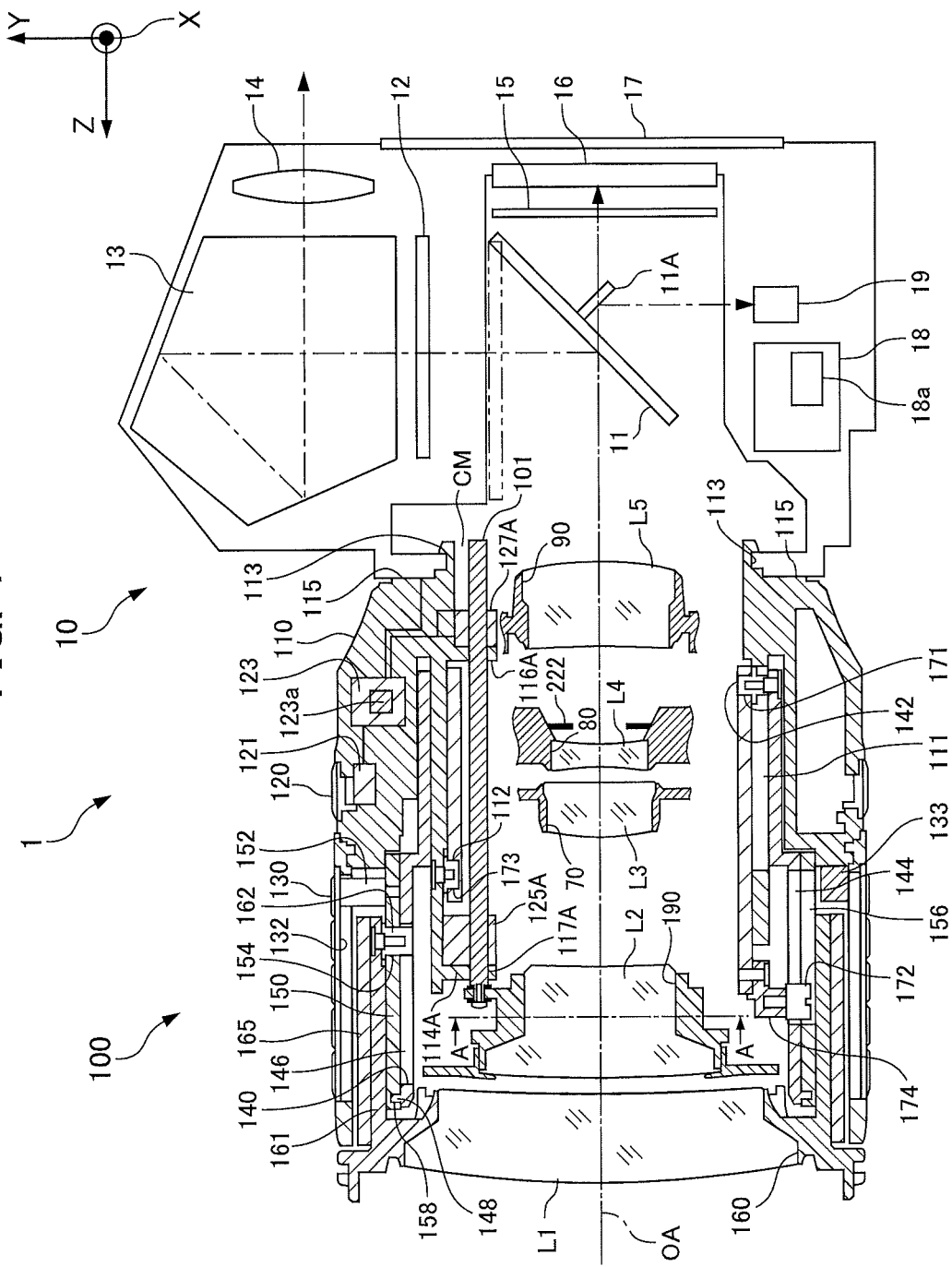
FIG. 1 is a diagram conceptually illustrating a camera which is a first embodiment according to the present invention.

FIG. 1 is a diagram conceptually illustrating a camera 1 which is a first embodiment according to the present invention.

In FIGS. 1 and 2, an XYZ orthogonal coordinate system is provided for better explanation and understanding. In this coordinate system, a direction pointing to the left side as seen from a photographer at the position (hereinafter referred to as a normal position) of a camera when the photographer takes images in a landscape orientation with the optical axis OA orientated horizontally is referred to as a positive X direction, and a direction pointing to the upper side at the normal position is referred to as a positive Y direction.

Moreover, a direction pointing to a subject at the normal position is referred to as a positive Z direction. This positive Z direction is also referred to as a subject side, and a negative Z direction is also referred to as an image side. Further, movement in a direction parallel to the optical axis OA (that is, the Z-axis) is referred to as "straight movement," and revolution about the optical axis OA is referred to as "rotation."

A camera 1 includes a camera body 10 and a lens barrel 100.

The lens barrel 100 is a so-called zoom lens of which the focal length can be adjusted. The lens barrel 100 includes a plurality of lenses (L1 to L5) that forms an imaging optical system and an aperture mechanism 222 that changes an opening size thereof to adjust the amount of incident light.

The lens barrel 100 further includes a lens mount 113 that detachably engages with a camera mount CM and is detachably attached to the camera body 10 with the lens mount 113 interposed. In this manner, the camera 1 can capture images while replacing with other lens barrels depending on the purpose.

The camera body 10 includes a quick return mirror 11, a finder screen 12, a pentagonal prism 13, an eyepiece optical system 14, a shutter 15, an image-capturing element 16, a display device 17, a control device 18, a distance measuring sensor 19, and the like.

The quick return mirror 11 is a mirror that is pivotably provided in the camera body 10 so that an optical path of a subject image focused by the lens barrel 100 is bent toward the finder screen 12. The quick return mirror 11 moves to a withdrawn position (indicated by a two-dot chain line in FIG. 1), at which entering of a subject beam to the image-capturing element 16 is not impaired, in response to a release operation.

Moreover, a half mirror is formed in a portion of the quick return mirror 11, and a sub-mirror 11A is arranged on a portion of a rear surface of the quick return mirror 11 corresponding to the half mirror portion. The sub-mirror 11A guides a subject image beam having passed through the half mirror portion of the quick return mirror 11 toward the distance measuring sensor 19. The sub-mirror 11A moves along the rear surface of the quick return mirror 11 with movement of the quick return mirror 11 toward the withdrawn position.

The finder screen 12 is a screen on which a subject image reflected by the quick return mirror 11 is formed and is disposed between the quick return mirror 11 and the pentagonal prism 13.

The pentagonal prism 13 is a prism having a pentagonal cross-sectional shape and is arranged above the camera body 10 posed in a horizontal attitude. The pentagonal prism 13 guides an image formed on the finder screen 12 toward the eyepiece optical system 14 as an erected image.

The eyepiece optical system 14 is an optical system for observing the subject image converted into an erected image by the pentagonal prism 13 at an enlarged scale and is disposed on an image side (photographer side) of the pentagonal prism 13.

The shutter 15 is opened and closed in response to a release operation to control an exposure period of the subject image beam formed in the image-capturing element 16.

The image-capturing element 16 is a photoelectric conversion element such as, for example, a CCD for converting the subject image formed by the lens barrel 100 into an electrical signal. The image-capturing element 16 is provided inside the camera body 10 in a state where a light receiving surface thereof is orthogonal to the optical axis OA.

The display device 17 includes a display panel of liquid crystal or the like provided on the photographer side outside the camera body 10. The display device 17 displays a captured image and information related to image-capturing such as an exposure period on the display panel.

The control device 18 is configured to include a CPU or the like and controls the above-described respective constituent components of the camera body 10 and the lens barrel 100 attached to the camera body 10 in a centralized manner.

The distance measuring sensor 19 detects information on the distance to a subject from the subject image beam incident via the sub-mirror 11A and outputs the distance information to the control device 18.

The camera body 10 is integrally combined with the lens barrel 100 as described above to form the camera 1. In the combined state, the control device 18 of the camera body 10 and a power source (not illustrated) are connected to the lens barrel 100 by a connection terminal (not illustrated), and the control device 18 is connected to a barrel control unit 123 described later of the lens barrel 100.

During image-capturing, the camera 1 operates in the following manner.

When a shutter button (not illustrated) provided in the camera body 10 is pressed (released), the quick return mirror 11 moves to the withdrawn position. The shutter 15 is opened and closed according to the release operation so that the subject image beam is exposed to the image-capturing element 16 for a predetermined period. The image-capturing element 16 converts the subject image beam into an electrical signal to capture an image. The image data captured by the image-capturing element 16 is recorded in a recording unit (not illustrated).

Image-capturing is performed in this manner, and during the image-capturing, the control device 18 controls the aperture mechanism 222 based on photometric information obtained by a photometric sensor (not illustrated) included in the camera body 10, and during an auto-focus operation, transmits the driving amount of linear actuators 125A, 125B, and 125C based on the distance information from the distance measuring sensor 19 to the barrel control unit 123.

Next, the lens barrel 100 will be described in detail with reference to FIGS. 2 to 6 in addition to FIG. 1.

Figure 3:
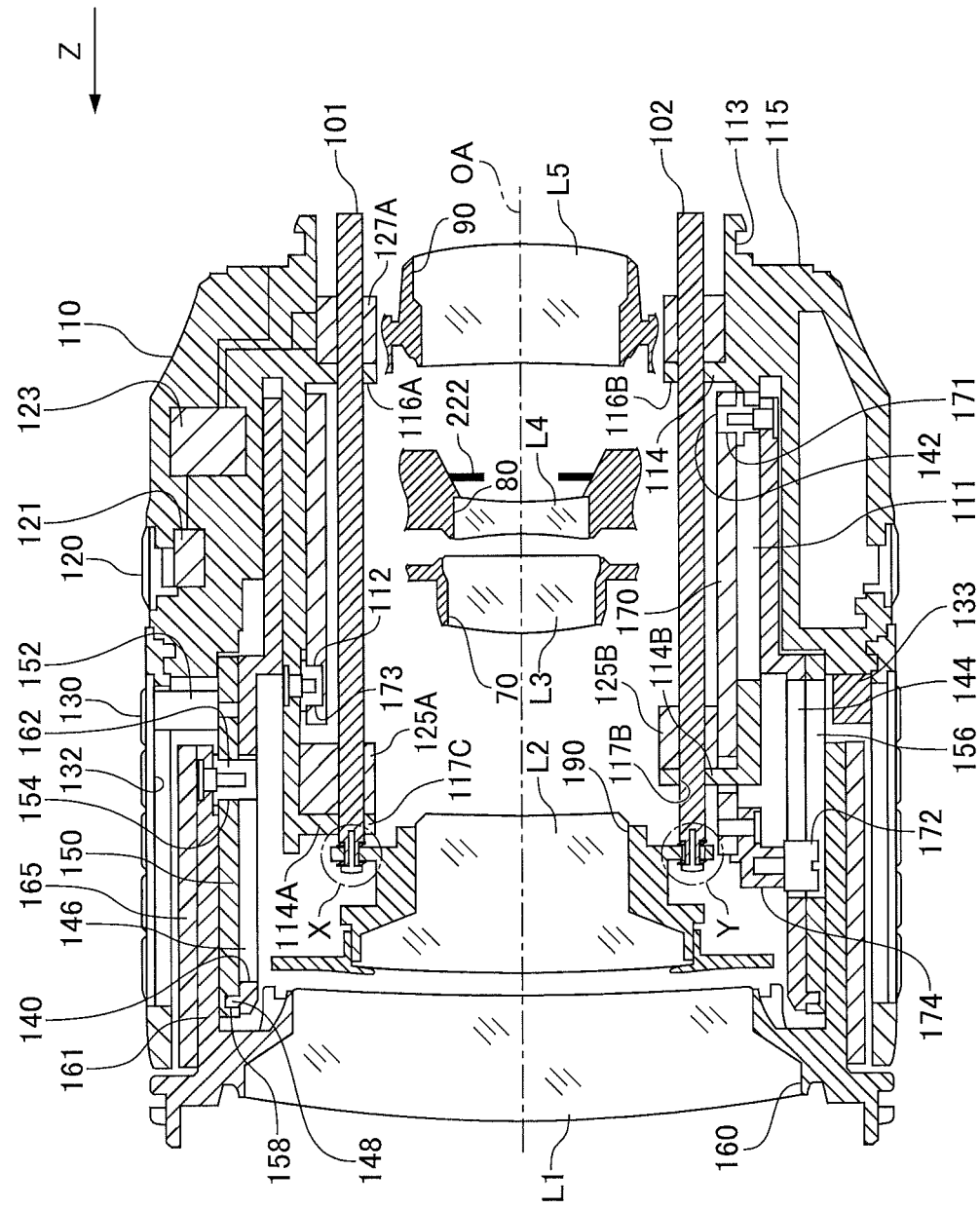
FIG. 3 is a cross-sectional view of the lens barrel taken along line B-B in FIG. 2.
Figure 4:
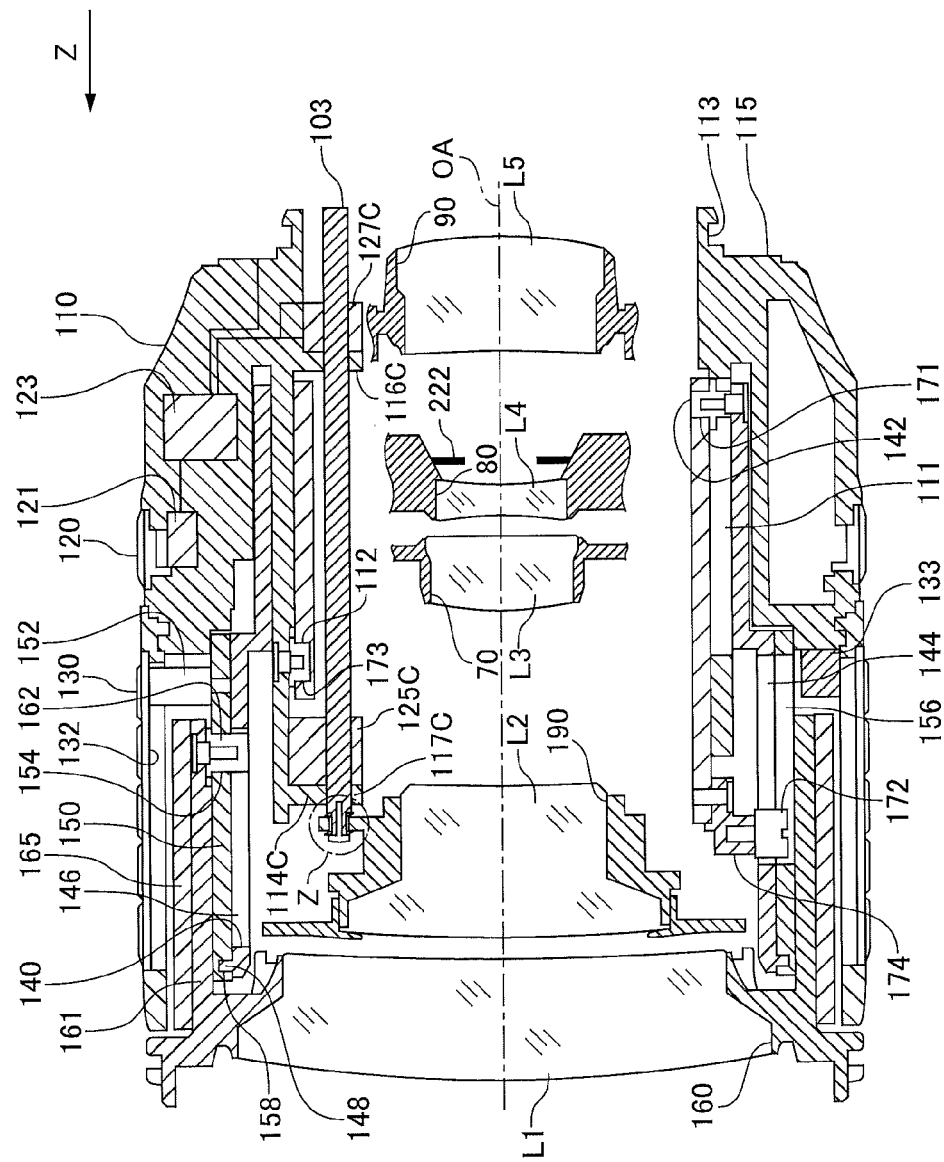
FIG. 4 is a cross-sectional view of the lens barrel taken along line C-C in FIG. 2.
Figure 5:
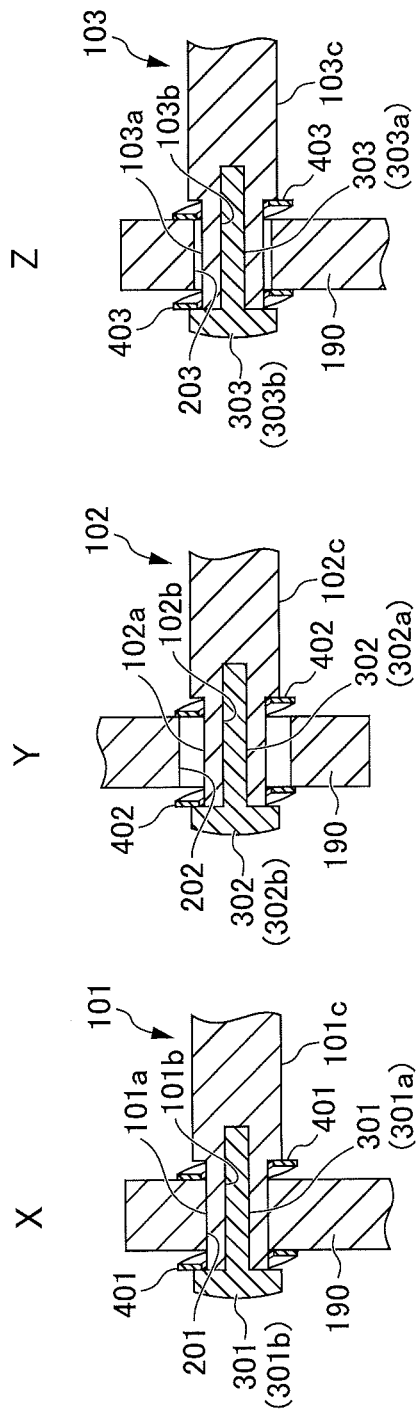

FIG. 2 is a diagram of the lens frame 190 of the lens barrel 100 of FIG. 1 when seen from the direction indicated by A-A. FIG. 3 is a cross-sectional view of the lens barrel 100 taken along line B-B in FIG. 2. FIG. 4 is a cross-sectional view of the lens barrel 100 taken along line C-C in FIG. 2. FIG. 1 is a cross-sectional view taken along line D-D in FIG. 2.

The lens barrel 100 includes five lens units L1, L2, L3, L4, and L5 that are sequentially arranged along the common optical axis OA as described above. The lenses L1, L2, L3, L4, and L5 are held by a first lens frame 160, a second lens frame 190, a third lens frame 70, a fourth lens frame 80, and a fifth lens frame 90, respectively.

The lens barrel 100 is an internal focusing zoom lens that uses the lens L2 as a focusing lens, and an overall focal length of the lens barrel 100 changes continuously when the lenses L1, L2, L3, L4, and L5 move by a predetermined amount in the optical axis OA direction (Z direction).

The lens L2 is a focus lens of which the focal position changes when the lens L2 moves in the optical axis OA direction. Further, the fourth lens frame 80 that holds the lens L4 includes the aperture mechanism 222 that changes the diameter of the optical path of the optical system including the lens L4.

The lens barrel 100 includes a fixed cylinder 110 to which the lens mount 113 that is detachable from the camera body 10 is fixed. An inner cylinder 140, a middle cylinder 150, an outer cylinder 161, and a zoom ring 130 which are at the same axis are disposed on the subject side of the fixed cylinder 110 in that order from the inner side.

A cam cylinder 170 that is rotatable in relation to the fixed cylinder 110 is disposed inside the fixed cylinder 110. Moreover, three guide bars (first guide bar 101 (see FIGS. 1, 2, and 3), second guide bar 102 (see FIGS. 2 and 3), and third guide bar 103 (see FIGS. 2 and 4)) disposed in parallel to the optical axis OA are disposed on a further inner side of the cam cylinder 170. In the present embodiment, these three guide bars 101, 102, and 103 have the same diameter; however, the present invention is not limited to this.

The fixed cylinder 110 includes a straight groove 111, a cam pin 112, the lens mount 113, a first supporting portion 114A, a second supporting portion 114B, and a third supporting portion 114C. The straight groove 111 extends in the optical axis OA direction of the lens barrel 100. The cam pin 112 protrudes inward in the radial direction from the inner circumferential surface of the fixed cylinder 110 and engages with a cam groove 173 described later of the cam cylinder 170.

When the lens mount 113 engages with the camera mount CM, the fixed cylinder 110 is fixed to the camera body 10. In the fixed cylinder 110 fixed to the camera body 10, a mount surface 115 at a rear end of the fixed cylinder 110 makes close contact with an front surface of the camera mount CM of the camera body 10. As a result, the entire lens barrel 100 is aligned with respect to the camera body 10.

The supporting portions 114A, 114B, and 114C protrude inward in the radial direction from the inner circumferential surface of the fixed cylinder 110 to support the guide bars 101, 102, and 103, respectively.

The first supporting portion 114A that supports the first guide bar 101 disposed on the upper side in FIGS. 1 and 3 includes a fitting hole 117BA having a shape that is complementary to the shape of the outer circumference of the first guide bar 101. The first guide bar 101 is supported by being inserted in the fitting hole 117B.

The second supporting portion 114B supporting the second guide bar 102 and the third supporting portion 114C supporting the third guide bar 103 have the same configuration as the first supporting portion 114A, and thus the description thereof will not be provided.

The inner cylinder 140 includes a cam follower 142, a clearance hole 144, a straight groove 146, and an engagement projection 148. The cam follower 142 protrudes inward in the radial direction of the lens barrel 100 from a portion near the rear end of the inner cylinder 140. The straight groove 146 extends in the optical axis OA direction of the lens barrel 100. The engagement projection 148 also protrudes outward in the radial direction of the lens barrel 100.

The cam follower 142 passes through the straight groove 111 and engages with a cam groove 171 described later of the cam cylinder 170. As a result, when the cam cylinder 170 rotates, rotation of the inner cylinder 140 about the optical axis OA is restricted. Moreover, driving force that moves the inner cylinder 140 in the optical axis OA direction is transmitted from the cam groove 171 to the cam follower 142.

The clearance hole 144 is disposed at a position different from that of the straight groove 146 in relation to the circumferential direction of the lens barrel 100. A cam follower 172 described later of the cam cylinder 170 is inserted into the clearance hole 144.

The middle cylinder 150 includes a cam follower 152, a cam groove 154, a straight groove 156, and an engagement circumferential groove 158. The cam follower 152 protrudes outward in the radial direction of the lens barrel 100 and engages with a guide groove 132 of the zoom ring 130. The cam groove 154 extends with an inclination with respect to the optical axis OA.

The straight groove 156 is disposed at a position different from that of the cam groove 154 in relation to the circumferential direction of the lens barrel 100. The straight groove 156 extends in the optical axis OA direction and engages with a cam follower 172 described later of the cam cylinder 170.

The engagement circumferential groove 158 is formed on the inner circumferential surface of the middle cylinder 150 so as to extend along a surface orthogonal to the optical axis OA. The engagement circumferential groove 158 engages with the engagement projection 148 of the inner cylinder 140. As a result, the middle cylinder 150 is freely rotatable about the optical axis OA independently from the inner cylinder 140 while moving integrally with the inner cylinder 140 in relation to the optical axis OA direction.

The outer cylinder 161 includes a cam follower 162. The cam follower 162 protrudes inward in the radial direction of the lens barrel 100 and engages with the cam groove 154 of the middle cylinder 150 and the straight groove 146 of the inner cylinder 140. As a result, when the middle cylinder 150 rotates about the optical axis OA, the cam follower 162 transmits driving force in the optical axis OA direction to the outer cylinder 161 while restricting the outer cylinder 161 from rotating about the optical axis OA.

Moreover, the outer cylinder 161 is combined with the first lens frame 160 that holds the lens L1. As a result, when the outer cylinder 161 moves in the optical axis OA direction, the lens L1 also moves along the optical axis OA.

The cam cylinder 170 is rotatably disposed inside the fixed cylinder 110. The cam cylinder 170 includes a plurality of cam grooves 171 and 173 and the cam follower 172. The cam grooves 171 and 173 are formed with an inclination with respect to the optical axis OA, respectively. The cam groove 171 engages with the cam follower 142 of the inner cylinder 140. The cam groove 173 engages with the cam pin 112 of the fixed cylinder 110.

The cam follower 172 protrudes outward in the radial direction by a connecting member 174 and engages with the straight groove 156 of the middle cylinder 150 by passing through the clearance hole 144 of the inner cylinder 140. As a result, when the middle cylinder 150 rotates about the optical axis OA, the driving force that rotates the cam cylinder 170 is transmitted from the cam follower 172 to the cam cylinder 170.

The cam cylinder 170 further includes other cam grooves (not illustrated) or the like in order to produce the driving force that moves the third, fourth, and fifth lens frames 70, 80, and 90 that hold the other lenses L3, L4, and L5, respectively. Moreover, in the cam cylinder 170, regions where cam grooves or the like are not formed may be removed for the purpose of reducing weight. Thus, it can be said that the cam cylinder 170 does not form a perfect cylinder.

The zoom ring 130 is attached so as to rotate about the optical axis OA along the outer circumferential surface of the fixed cylinder 110. Moreover, the zoom ring 130 has the guide groove 132 formed on an inner circumferential surface thereof. The guide groove 132 extends in a straight line in parallel to the optical axis OA direction. The guide groove 132 engages with the cam follower 152 of the middle cylinder 150. As a result, when the zoom ring 130 is rotated, the middle cylinder 150 also rotates about the optical axis OA.

A zoom ring rotation amount detecting unit 133 is disposed on the inner side of the zoom ring 130. The zoom ring rotation amount detecting unit 133 detects a rotation amount of the zoom ring 130 rotated by a rotating operation from the outside to transmit a rotation amount signal corresponding to the rotation amount to a barrel control unit 123 described later.

The zoom ring rotation amount detecting unit 133 can be formed, for example, using a rotary scale that rotates together with the zoom ring 130 and an optical sensor that counts the scale of the rotary scale. Moreover, the zoom ring rotation amount detecting unit 133 may be formed using a magnet body that rotates together with the zoom ring 130 and a magnetic body sensor that measures a change in a magnetic field occurring due to movement of the magnetic body. These structures are examples only and other structures may be used.

Moreover, a focus ring 120 is disposed on the outer circumferential surface of the lens barrel 100 on the image side (the right side in the drawing) of the zoom ring 130. The focus ring 120 is attached so as to be rotatable about the optical axis OA along the outer circumferential surface of the fixed cylinder 110.

A focus ring rotation amount detecting unit 121 is disposed on the inner side of the focus ring 120.

The focus ring rotation amount detecting unit 121 detects a rotation amount of the focus ring 120 rotated by a rotating operation from the outside to transmit a rotation amount signal corresponding to the rotation amount to the barrel control unit 123 described later.

The focus ring rotation amount detecting unit 121 can be formed, for example, using a rotary scale that rotates together with the focus ring 120 and an optical sensor that counts the scale of the rotary scale. Moreover, the focus ring rotation amount detecting unit 121 may be formed using a magnetic body that rotates together with the focus ring 120 and a magnetic sensor that measures a change in a magnetic field occurring due to movement of the magnetic body. These structures are examples only and other structures may be used.

The guide bars 101, 102, and 103 hold the second lens frame 190 at an end portion close to the subject side. FIG. 5A illustrates a holding state of the first guide bar 101 and is an enlarged view of a region X in FIG. 3. FIG. 5B illustrates a holding state of the second guide bar 102 and is an enlarged view of a region Y in FIG. 3. FIG. 5C illustrates a holding state of the third guide bar 103 and is an enlarged view of a region Z in FIG. 4. FIG. 6 is a diagram illustrating only the second lens frame 190 in FIG. 2.

As illustrated in FIGS. 5A, 5B, and 5C, the guide bars 101, 102, and 103 include body portions 101*c*, 102*c*, and 103*c* and small-diameter portions 101*a*, 102*a*, and 103*a* that are provided in the end portions close to the subject side of the body portions 101*c*, 102*c*, and 103*c* and that are at the same axis as and narrower than the body portions 101*c*, 102*c*, and 103*c*. These small-diameter portions 101*a*, 102*a*, and 103*a* are longer than the thickness of the second lens frame 190, and screw holes 101*b*, 102*b*, and 103*b* are formed therein so as to penetrate from the subject side to the image side.

On the other hand, as illustrated in FIGS. 2 and 6, three holes 201, 202, and 203 are formed at an equal interval in the circumferential direction so that the distance in the radial direction from the center (optical axis OA) of the second lens frame 190 is substantially equal. That is, the holes 201, 202, and 203 are disposed to form an approximately regular triangle when these three holes are connected.

(First Hole)

The first hole 201 among the three holes is a circular hole formed above the second lens frame 190 in the positive Y direction and has a diameter slightly larger than the diameter of the small-diameter portion 101*a*.

As illustrated in FIGS. 5A to 5C, the small-diameter portion 101*a* of the first guide bar 101 is fitted to the first hole 201, and a screw 301 having a screw portion 301*a* that screws with the screw hole 101*b* is inserted from the subject side.

On the outer circumference of the small-diameter portion 101*a*, a biasing spring 401 is disposed between an end portion between the small-diameter portion 101*a* and the body portion 101*c* and one side wall of the lens frame 190. Moreover, on the outer circumference of the small-diameter portion 101*a*, the biasing spring 401 is also disposed between a screw head 301*b* and the other side wall of the lens frame 190. As a result, the lens frame 190 is biased in the optical axis direction by the biasing spring 401.

In the present embodiment, although a wave washer is used as the biasing spring 401, the present invention is not limited to this and another biasing member such as a coil spring may be used. Moreover, in the present embodiment, although the biasing springs 401 are disposed on both sides of the lens frame 190, the biasing spring 401 may be disposed on any one side.

(Second Hole)

The second hole 202 is a long hole formed on the negative X side and the negative Y side of the second lens frame 190, and a length in a major axis thereof is larger than the diameter of the first hole 201.

As illustrated in FIG. 6, the second hole 202 is formed so that a straight line extending in the major axis of the second hole 202 passes the center of the first hole 201.

The small-diameter portion 102*a* of the second guide bar 102 is fitted to the second hole 202 with a minimum necessary gap, and a screw 302 having a screw portion 302*a* that screws with the screw hole 102*b* is inserted from the subject side.

On the outer circumference of the small-diameter portion 102*a*, biasing springs 402 are disposed at the same two positions as the small-diameter portion 101*a*.

As described above, the second hole 202 is a long hole and is formed so that a straight line extending in the major axis thereof passes the center of the first hole 201. Thus, the second guide bar 102 can be inserted in the second hole 202 even when a relative distance to the first guide bar 101 has a small error from a design value.

(Third Hole)

The third hole 203 is a circular hole formed on the positive X side and the negative Y side of the second lens frame 190 and has a sufficient gap necessary for avoiding redundant constraint in relation to the small-diameter portion 103*a* of the third guide bar 103.

Similarly to the first and second guide bars 101 and 102, the small-diameter portion 103*a* is inserted in the third hole 203, and a screw 303 having a screw portion 303*a* that screws with the screw hole 103*b* is inserted from the subject side.

On the outer circumference of the small-diameter portion 103*a*, biasing springs 403 are disposed at the same two positions as the small-diameter portion 101*a*.

As described above, since the diameter of the third hole 203 is larger than that of the small-diameter portion 103*a* of the third guide bar 103 and the first hole 201, the third guide bar 103 can be inserted in the third hole 203 even when a relative distance of the third guide bar 103 to the first and second guide bars 101 and 102 has a small error from a design value.

According to the present embodiment, due to the screws 301, 302, and 303, the first, second, and third guide bars 101, 102, and 103 are prevented from being removed from the second lens frame 190.

Moreover, the first, second, and third guide bars 101, 102, and 103 are elastically fixed to the second lens frame 190.

Thus, the first, second, and third guide bars 101, 102, and 103 move together with the second lens frame 190 in the optical axis direction and the direction vertical to the optical axis.

Further, on the outer circumferences of the small-diameter portions 101*a*, 102*a*, and 103*a*, the biasing springs 401, 402, 403 are disposed on both sides of the lens frame 190, respectively. Due to this, the lens frame 190 is not completely fixed to the guide bars 101, 102, and 103 but is elastically fixed in a state of being biased in the optical axis direction. Therefore, the second lens frame 190 can be tilted to some extent in relation to the first, second, and third guide bars 103, 102, and 103.

Returning to FIGS. 1, 3, and 4, the lens barrel 100 includes the first, second, and third linear actuators 125A, 125B, and 125C on the subject side on the inner side of the fixed cylinder 110.

The linear actuators 125A, 125B, and 125C are arranged on the image side of the supporting portions 114A, 114B, and 114C that support the guide bars 101, 102, and 103 on the subject side, respectively. The linear actuators 125A, 125B, and 125C can be driven so as to move the guide bars 101, 102, and 103 in the optical axis OA direction.

The linear actuators 125A, 125B, and 125C may have the same output power and may have different output power.

When the guide bars 101, 102, and 103 are driven by the linear actuators 125A, 125B, and 125C, the second lens frame 190 combined to the guide bars 101, 102, and 103 and the lens L2 held by the lens frame 190 are moved in the optical axis OA direction.

A moving mechanism of the lens L2 by the linear actuators 125A, 125B, and 125C is completely independent from moving mechanisms of the other lenses L1, L3, L4, and L5. Thus, the lens L2 can move independently regardless of the other lenses L1, L3, L4, and L5.

The lens barrel 100 further includes first, second, and third position detecting units 127A, 127B, and 127C that are disposed on the image side on the inner side of the fixed cylinder 110 so as to detect the positions of the first, second, and third guide bars 101, 102, and 103, respectively.

The first, second, and third position detecting units 127A, 127B, and 127C are arranged on the image side of supporting portions 116A, 116B, and 116C that support the guide bars 101, 102, and 103 on the image side, respectively.

The position detecting units 127A, 127B, and 127C can detect an absolute position of the lens barrel 100 in relation to the fixed cylinder 110. For example, the position detecting units 127A, 127B, and 127C are formed, for example, using a linear scale that moves integrally with the first guide bar 101 and an optical sensor that counts the scale of the linear scale. Moreover, the position detecting units 127A, 127B, and 127C may be formed using a magnetic body that moves together with the first guide bar 101 and a magnetic sensor that measures a change in a magnetic field occurring due to movement of the magnetic body. However, these structures are examples only and other structures may be used.

When the linear actuators 125A, 125B, and 125C move the guide bars 101, 102, and 103, respectively, the position detecting units 127A, 127B, and 127C are operated to detect the positions of the guide bars 101, 102, and 103, respectively.

The barrel control unit 123 controls the driving of the linear actuators 125A, 125B, and 125C based on the rotation amount information of the zoom ring 130 input from the zoom ring rotation amount detecting unit 133, the rotation amount information of the focus ring 120 input from the focus ring rotation amount detecting unit 121, and the focus information input from the camera body 10.

Moreover, the barrel control unit 123 includes an internal memory 123*a*.

The lenses L3, L4, and L5 have a configuration in which the third, fourth, and fifth lens frames 70, 80, and 90 are connected to the cam cylinder 170 rotated by rotation of the zoom ring 130 by an interlocking mechanism. An existing optional driving mechanism can be used as the interlocking mechanism. In this way, the lenses L3, L4, and L5 are moved in a predetermined relation in the optical axis OA direction by a rotating operation of the zoom ring 130, respectively.

A cover cylinder 165 attached at the same axis as the fixed cylinder 110 is disposed between the outer cylinder 161 and the zoom ring 130. The cover cylinder 165 can advance and retract along the outer cylinder 161 and seals a space between the outer cylinder 161 and the zoom ring 130. In this way, the cover cylinder 165 prevents dust from entering into the lens barrel 100.

The lens barrel 100 having the above-described configuration operates in the following manner when the zoom ring 130 is rotated, and the focal distance changes continuously between a wide-side end and a tele-side end.

When the zoom ring 130 is rotated from the outside so that the lens barrel 100 rotates about the optical axis OA, rotation driving force is transmitted to the middle cylinder 150 via the cam follower 152 that engages with the guide groove 132. When the middle cylinder 150 is rotated, driving force is transmitted from the cam groove 154 to the cam follower 162 of the outer cylinder 161.

Upon receiving the driving force, the cam follower 162 is guided to the straight groove 146 of the inner cylinder 140 to move straightly (moves in the optical axis OA direction). As a result, the first lens frame 160 combined to a distal end of the outer cylinder 161 and the lens L1 held by the first lens frame 160 integrally move straightly.

Moreover, when the middle cylinder 150 rotates, rotation driving force is also transmitted to the cam follower 172 that engages with the straight groove 156. As a result, the cam cylinder 170 rotates about the optical axis OA along the inner circumferential surface of the fixed cylinder 110.

When the cam cylinder 170 rotates, the driving force is transmitted to the cam follower 142 that engages with the cam groove 171. The cam follower 142 is guided to the straight groove 111 of the fixed cylinder 110 to move straightly. As a result, the inner cylinder 140 and the middle cylinder 150 that engages with the inner cylinder 140 with the aid of the engagement circumferential groove 158 move straightly.

Moreover, when the cam cylinder 170 rotates, the cam cylinder 170 itself moves straightly by being driven by the cam pin 112 of the fixed cylinder 110 that engages with the cam groove 173.

In this manner, when the zoom ring 130 is rotated, the lenses L1, L3, L4, and L5 move so that the mutual gap changes.

Moreover, when the zoom ring 130 is rotated, the barrel control unit 123 controls the linear actuators 125A, 125B, and 125C based on the rotation amount of the zoom ring 130 input from the zoom ring rotation amount detecting unit 133 to move the lens L2 to a predetermined position corresponding to the rotation of the zoom ring 130.

By these series of operations, the lens barrel 100 is extended or contracted so that the gap between the lenses L1, L2, L3, and L4 and the lens L5 changes and the focal distance of the entire optical system changes.

Moreover, when the focus ring 120 is rotated, the lens barrel 100 operates in the following manner and the focus distance changes.

That is, when the focus ring 120 is rotated, the rotation amount information of the focus ring 120 is input from the focus ring rotation amount detecting unit 121 to the barrel control unit 123. The barrel control unit 123 controls the linear actuators 125A, 125B, and 125C based on the rotation amount information of the focus ring 120.

As a result, the guide bars 101, 102, and 103 guide the movement in the optical axis OA direction of the second lens frame 190 holding the lens L2 so that the lens L2 moves in the optical axis OA direction and the focus distance changes.

As described above, since a moving mechanism of the lens L2 by the linear actuators 125A, 125B, and 125C is completely independent from moving mechanisms of the other lenses L1, L3, L4, and L5, the lenses L1, L3, L4, and L5 other than the lens L2 will not move when the focus ring 120 is rotated.

Here, in the present embodiment, the second lens frame 190 (that is, a second lens unit L2) is supported by the guide bars 101, 102, and 103, respectively.

Moreover, the positions of the guide bars 101, 102, and 103 at which the second lens frame 190 is supported are determined by the small-diameter portions 101b, 102b, and 103b of the guide bars 101, 102, and 103.

On the outer circumference of the small-diameter portions 101a, 102a, and 103a, the biasing spring 401 is disposed between the step portion between the small-diameter portions 101a, 102a, and 103a and the body portions 101c, 102c, and 103c and one side wall of the lens frame 190. Moreover, on the outer circumference of the small-diameter portions 101a, 102a, and 103a, the biasing spring 401 is also disposed between the screw heads 301b, 302a, and 303a and the other side wall of the lens frame 190. As a result, the lens frame 190 is biased in the optical axis direction by the biasing springs 401, 402, and 403.

Thus, when the positional relation of the three guide bars 101, 102, and 103 in the optical axis direction is changed, the second lens frame 190 can be tilted with respect to the optical axis.

Here, the lens barrel 100 includes a plurality of lenses as illustrated in the drawing. When the lens barrel 100 is assembled, manufacturing errors and assembling errors are accumulated. After the lens barrel is manufactured, these errors are accumulated and the optical performance of the lens barrel 100 may deteriorate with tilting and shifting of lenses.

However, in the present embodiment, the lens L2 can be tilted with respect to the optical axis by changing the relative positional relation of the guide bars 101, 102, and 103, respectively. With this tilting, deterioration of the optical performance resulting from these accumulated errors can be eliminated.

In the present embodiment, images are captured in advance by the image-capturing element 16 at a plurality of positions of the lenses L2 in the optical axis direction, the information on the relative position of the guide bars 101, 102, and 103 at which the lens L2 is tilted such that the optical performance (that is, the performance of the optical system formed of the lenses L1, L2, L3, and L4 and the lens L5) of the lens barrel 100 is optimized is calculated, and the relative position information is stored in the memory 123a of the barrel control unit 123.

When the focal distance of the entire optical system changes with the operation of the zoom ring 130, the positions in the optical axis direction of the lenses L1, L2, L3, and L4 and the lens L5 change. That is, when the focal distance changes, the optical performance of the entire optical system may change. Thus, images may be captured in advance by the image-capturing element 16 at a plurality of focal distances, the information on the relative position of the guide bars 101, 102, and 103 at which the lens L2 is tilted such that the optical performance is optimized may be calculated, and the relative position information may be stored in the memory 123a of the barrel control unit 123.

Further, images may be captured at a plurality of positions in the optical axis direction of the lens L2, the information on the relative position of the guide bars 101, 102, and 103 at which the lens L2 is tilted such that the optical performance is optimized may be calculated, and the relative position information may be stored in the memory 123a of the barrel control unit 123.

In an actual image-capturing operation, the relative positional relation of the guide bars 101, 102, and 103 is changed based on the position information from the position detecting units 127A, 127B, and 127C based on the information stored in the memory 123a according to the position (or the focal distance) of the lens L2 so that the lens L2 is tilted optimally according to the position (or the focal distance) of the lens L2.

When control is performed so that the lens L2 is tilted optimally according to the focal distance (or both the position of the lens L2 and the focal distance), a detecting unit that detects the rotation amount of the zoom ring 130 may be provided and the detected rotation amount information may be input to the barrel control unit 123.

According to the present embodiment, the following advantages are obtained.

(1) Three linear actuators 125A, 125B, and 125C that drive three guide bars 101, 102, and 103 in the optical axis direction, respectively, are provided. These linear actuators 125A, 125B, and 125C are controlled to adjust the driving amount in the optical axis direction of the three guide bars 101, 102, and 103 so that the lens frame 190 is tilted from a direction orthogonal to the optical axis. In this way, the lens frame 190 can be tilted according to the position in the optical axis direction of the focusing lens L2 such that the optical performance of the lens barrel 100 is optimized.

(2) The guide bars 101, 102, and 103 guide the movement in the optical axis OA direction of the second lens frame 190 holding the lens L2. In this case, since the second lens frame 190 is held by the three guide bars 101, 102, and 103, rotation of the lens L2 in the direction vertical to the optical axis is prevented. As a result, the lenses can be driven in a well-balanced manner.

(3) The first hole 201 formed in the second lens frame 190 is fitted so that the first guide bar 101 does not move in a direction vertical to the optical axis in relation to the second lens frame 190, the second hole 202 is a long hole, and the third hole has a diameter larger than the diameter of the small-diameter portion of the guide bar in which the second lens frame 190 is inserted.

Thus, even when the relative positions of the guide bars 101, 102, and 103 in a plane vertical to the optical axis are shifted slightly due to manufacturing errors, the guide bars 101, 102, and 103 are reliably inserted in the holes 201, 202, and 203 of the second lens frame 190. That is, the guide bars 101, 102, and 103 are not constrained redundantly.

Second Embodiment

Hereinafter, a second embodiment of the present invention will be described. The same constituent components as the first embodiment will be denoted by the same reference numerals, and the description thereof will not be provided.

Figure 7:
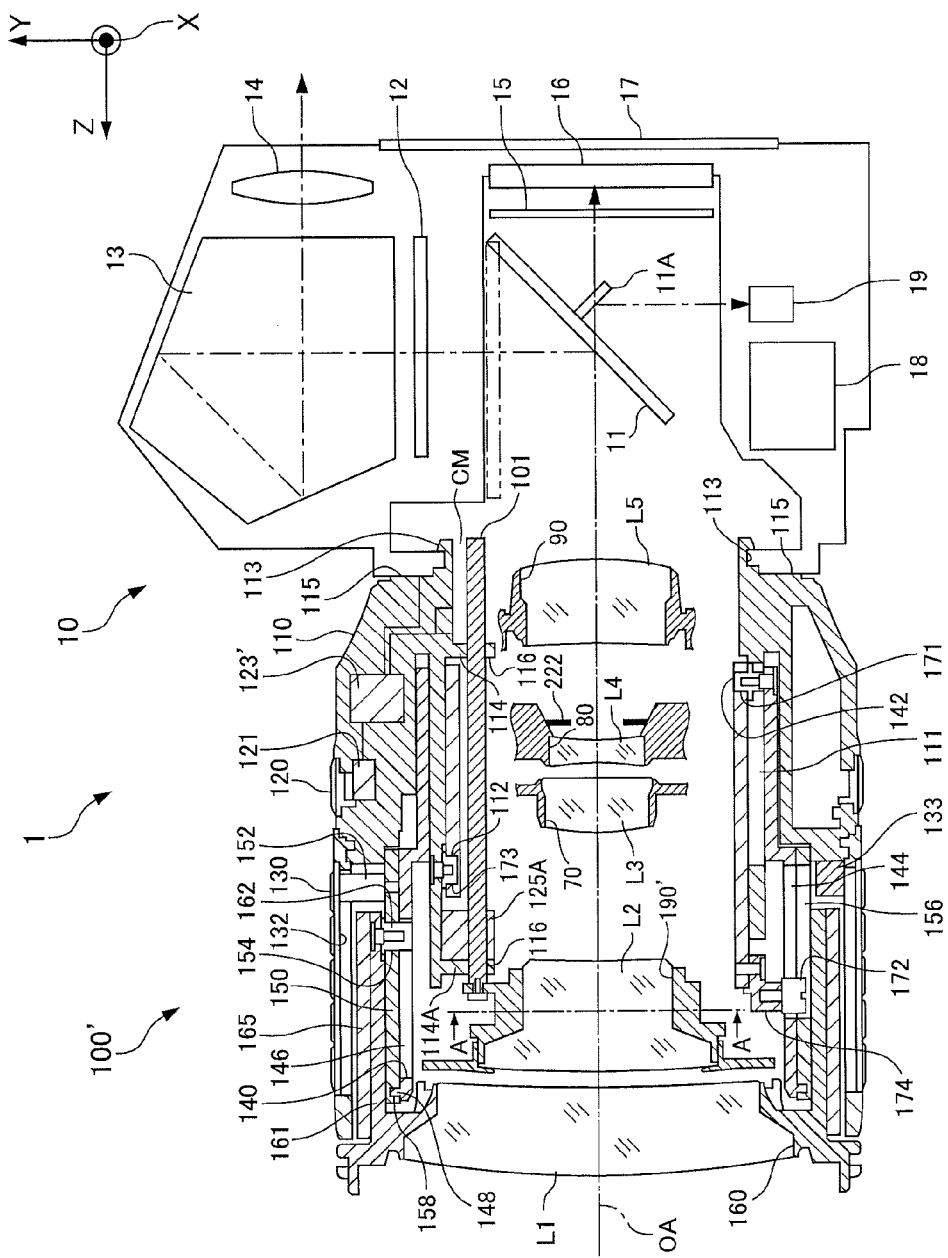
FIG. 7 is a diagram schematically illustrating a camera which is the first embodiment according to the present invention.
Figure 8:
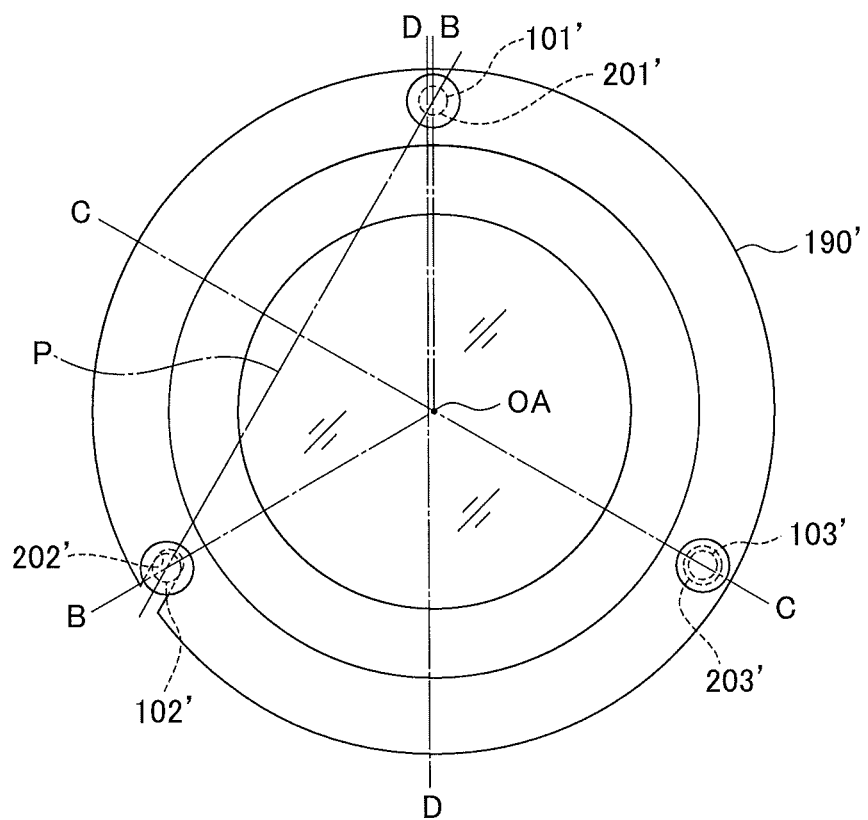
FIG. 8 is a diagram of a lens frame of a lens barrel of FIG. 7 when seen from a direction indicated by A-A.
Figure 9:
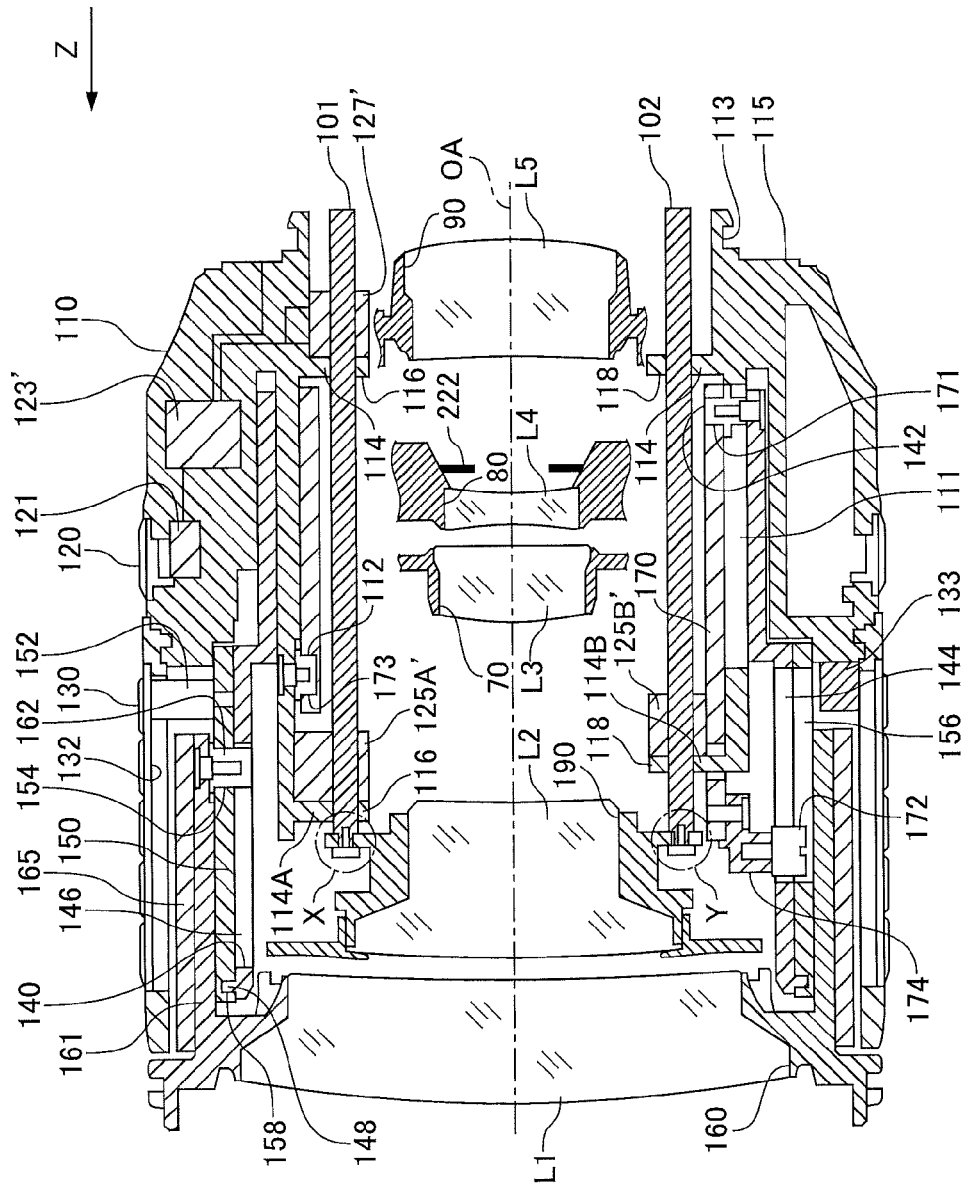
FIG. 9 is a cross-sectional view of the lens barrel taken along line B-B in FIG. 8.
Figure 10:
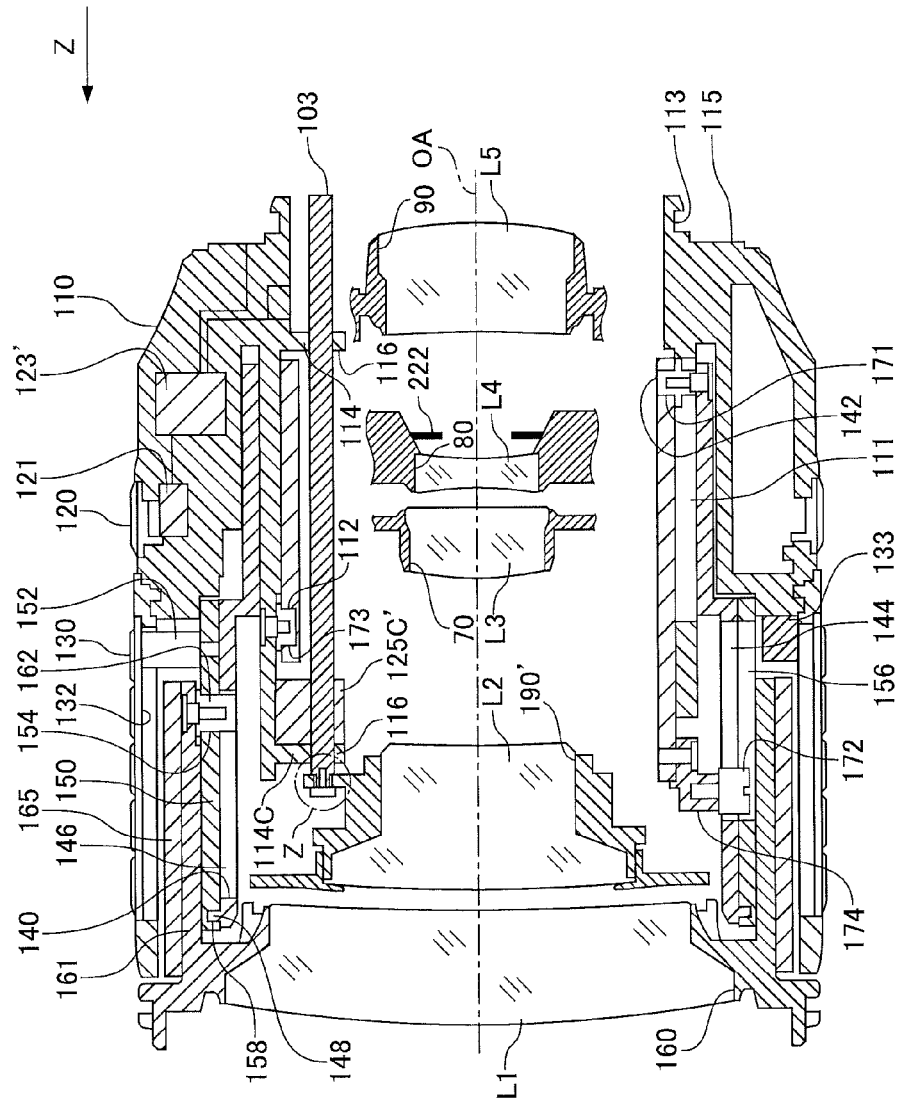
FIG. 10 is a cross-sectional view of the lens barrel taken along line C-C in FIG. 8.

FIG. 7 is a diagram conceptually illustrating a camera 1 which is an embodiment according to the present invention. FIG. 8 is a diagram of a lens frame 190' of a lens barrel 100' of FIG. 7 when seen from the direction indicated by A-A. FIG. 9 is a cross-sectional view of the lens barrel 100' taken along line B-B in FIG. 8. FIG. 10 is a cross-sectional view of the lens barrel 100' taken along line C-C in FIG. 8. FIG. 7 is a cross-sectional view taken along line D-D in FIG. 8.

Guide bars 101', 102', and 103' of the second embodiment hold the second lens frame 190' at an end portion close to the subject side.

Figure 11A:
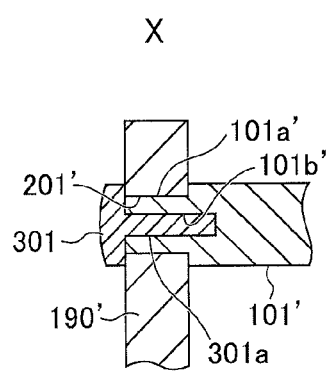
Figure 11B:
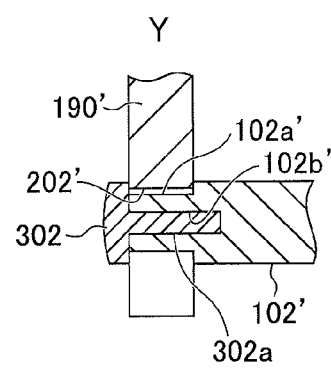
Figure 11C:
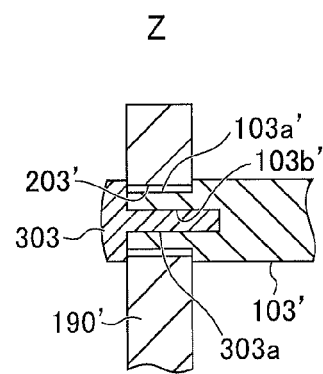

FIG. 11A illustrates a holding state of the first guide bar 101' and is an enlarged view of a region X in FIG. 9. FIG. 11B illustrates a holding state of the second guide bar 102' and is an enlarged view of a region Y in FIG. 9. FIG. 11C illustrates a holding state of the third guide bar 103' and is an enlarged view of a region Z in FIG. 9.

FIG. 12 is a diagram illustrating only the second lens frame 190' of FIG. 8.

Unlike the first embodiment, in the second embodiment, one position detecting unit (movement amount detecting unit) 127' is provided in the first guide bar 101'.

Moreover, as illustrated in FIGS. 11A, 11B, and 11C, unlike the first embodiment, small-diameter portions 101a', 102a', and 103a' that are provided in the end portions closer to the subject side of body portions 101c', 102c', and 103c' and that are at the same axis as and thinner than the body portions 101c', 102c', and 103c' have approximately the same length as the thickness of the second lens frame 190'.

Similarly to the first embodiment, in the second embodiment, three holes 201', 202', and 203' are formed in the second lens frame 190' as illustrated in FIGS. 8 and 12. Hereinafter, the difference of these holes from those of the first embodiment will be described.

(First Hole)

Although the first hole 201' of the three holes is a circular hole formed above the second lens frame 190' in the positive Y direction similarly to the first embodiment, the first hole 201' has substantially the same diameter as the diameter of the small-diameter portion 101a' unlike the first embodiment. Moreover, the biasing spring 401 of the first embodiment is not provided.

An end surface of the first guide bar 101' is in contact with a side surface of the screw 301.

Moreover, a minimum necessary gap is provided between the small-diameter portion 101a' and the second lens frame 190' in the optical axis direction so that the first guide bar 101' is not constrained redundantly when the second lens frame 190' moves in the optical axis direction according to a zooming operation. However, the present invention is not limited to this, and unlike the second and third guide bars 102' and 103' described later, in the first guide bar 101', the small-diameter portion 101a' and the second lens frame 190' may be fixed without providing a gap therebetween in the optical axis direction.

(Second Hole)

The second hole 202' is a U-shaped groove 202' formed on the negative X side and the negative Y side of the second lens frame 190'. The second hole 202' has substantially the same width (distance between facing side surfaces) as the diameter of the small-diameter portion 102a'.

The U-shaped groove 202' is formed so that a straight line P (a symmetric axis on a cross-section that forms the U-shape of the U-shaped groove) extending from the center in the width direction of the opening to the center of the bottom of the groove passes through the center of the first hole 201'.

The small-diameter portion 102a' of the second guide bar 102' is fitted to the second hole (U-shaped groove) 202'. Here, an end surface of the guide bar 102' is in contact with a side surface of the screw 302. Moreover, a minimum necessary gap is provided between the small-diameter portion 102a' and the second lens frame 190' in the optical axis direction so that the second guide bar 102' is not constrained redundantly when the second lens frame 190' moves in the optical axis direction according to a zooming operation.

As a result, the second guide bar 102' can be inserted in the second hole 202' even when a relative distance to the first guide bar has a small error from a design value.

(Third Hole)

The third hole 203' is a circular hole formed on the positive X side and the negative Y side of the second lens frame 190' and has a diameter larger than the small-diameter portion 103a' of the third guide bar 103'.

An end surface of the third guide bar 103' is in contact with a side surface of the screw 303. Moreover, a minimum necessary gap is provided between the small-diameter portion 103a' and the second lens frame 190' in the optical axis direction so that the third guide bar 103' is not constrained redundantly when the second lens frame 190' moves in the optical axis direction according to a zooming operation.

As a result, the third guide bar 103' can be inserted in the third hole 203' even when a relative distance of the third guide bar 103' to the first and second guide bars 101' and 102' has a small error from a design value.

The linear actuators 125A', 125B', and 125C' operate by the driving amount corresponding to the driving signal output from a barrel control unit 123' described later to drive the guide bars 101', 102', and 103', respectively.

In the present lens barrel 100' having the above-described configuration, the movement of the lens L2 during changing of focal distance (zooming) and focusing is performed by the linear actuators 125A', 125B', and 125C' controlled by the barrel control unit 123'.

The position detecting unit 127' is arranged on the image side of the supporting portion 114 that supports the first guide bar 101' on the image side. The position detecting unit 127' operates when the linear actuator 125 moves the first guide bar 101', detects a movement amount in the optical axis OA direction of the first guide bar 101' in relation to the fixed cylinder 110, and transmits a movement amount signal corresponding to the detected movement amount to the barrel control unit 123'.

The barrel control unit 123' controls the driving of the linear actuators 125A', 125B', and 125C' based on the rotation amount information of the zoom ring 130 input from the zoom ring rotation amount detecting unit 133, the rotation amount information of the focus ring 120 input from the focus ring rotation amount detecting unit 121, and the movement amount information of the first linear actuator 125A' input from the position detecting unit 127'.

That is, the barrel control unit 123' stores computation information for computing the position of the lens L2 in relation to the rotation amount of the zoom ring 130, computes the position of the lens L2 based on the rotation amount information input from the zoom ring rotation amount detecting unit 133 when the zoom ring 130 rotates, and drives the linear actuators 125A', 125B', and 125C' so as to move the lens L2 to the computed position.

Moreover, the barrel control unit 123' stores computation information for computing the position of the lens L2 in relation to the rotation amount of the focus ring 120, computes the position of the lens L2 based on the rotation amount information input from the focus ring rotation amount detecting unit 121 when the focus ring 120 rotates, and drives the linear actuators 125A', 125B', and 125C' so as to move the lens L2 to the computed position.

Here, a predetermined position of the lens L2 corresponding to the rotation of the zoom ring 130 is a position at which the lens L2 is moved by an amount which is the sum of a movement amount required for changing the focal distance based on the rotation amount of the zoom ring 130 and a focus adjustment correction amount for not changing the focus distance (focusing position).

That is, in the present lens barrel 100' in which the lens L2 is a focusing lens, when the focal distance changes, the moving distance (focus movement range) of the lens L2 ranging from the closest distance to the infinity changes (the moving distance increases as the focal distance increases). Due to this, during changing of focal distance (during a zooming operation), the barrel control unit 123' moves the lens L2 by an amount which is the sum of a movement amount corresponding to a change in the focal distance thereof and a focus adjustment correction amount for eliminating a shift of the focus position before the zooming operation is performed. In this way, even when the zooming operation is performed, the focus position is maintained, and a focus shift does not occur.

Here, the barrel control unit 123' controls the linear actuators 125A', 125B', and 125C' so that the lens L2 moves between the nearest distance and the infinity by the always constant rotation amount (rotation angle) of the focus ring 120 regardless of the focal distance. That is, as described above, in the lens barrel 100', although the focus movement range (movement amount) of the lens L2 ranging from the nearest distance to the infinity changes according to the focal distance, the barrel control unit 123' performs control so that the ratio of the movement amount of the lens L2 to the rotation amount of the focus ring 120 is changed according to the focal distance, and the rotation amount of the focus ring 120 between the nearest distance and the infinity is always constant regardless of the focal distance.

Moreover, the barrel control unit 123' corrects a driving signal to be generated by referring to the movement amount signal received from the position detecting unit 127'. In this way, it is possible to correct a movement amount error of the guide bars 101', 102', and 103' resulting from disturbance to accurately move the lens L2 and to quickly bring the lens barrel 100' into a focusing state with high accuracy.

When the lens barrel 100' is brought into a focusing state according to the auto-focus control of the control device 18 of the camera body 10 illustrated in FIG. 1, the focus ring 120 is not rotated. In such a case, the movement amount of the lens L2 required for bringing the lens barrel 100' into a focusing state is transmitted from the control device 18 of the camera body 10 to the barrel control unit 123' as a required movement amount signal. Upon receiving the required movement amount signal, the barrel control unit 123' generates a driving signal suitable for the required movement amount and supplies the same to the linear actuators 125A', 125B', and 125C'.

According to the present embodiment, the following advantages are obtained.

(1) The guide bars 101', 102', and 103' guide the movement in the optical axis OA direction of the second lens frame 190' holding the lens L2. In this case, since the second lens frame 190' is held by the three guide bars 101', 102', and 103', rotation of the lens L2 in the direction vertical to the optical axis is prevented. As a result, the lenses can be driven in a well-balanced manner.

(2) Although the guide bars 101', 102', and 103' can move in the optical axis direction in relation to the fixed cylinder 110, the guide bars 101', 102', and 103' are held so that the movement in the direction vertical to the optical axis is restricted. That is, the relative positional relation of the guide bars 101', 102', and 103' in the direction vertical to the optical axis is fixed by the supporting portion 114 of the fixed cylinder 110. However, the relative positional relation of these guide bars may be different from one lens barrel to another due to manufacturing errors or the like.

Due to this, when the holes 201', 202', and 203' of the second lens frame 190' in which the guide bars 101', 102', and 103' are inserted are not formed so as to allow small manufacturing errors, it may not be possible to insert the guide bars 101', 102', and 103' in the holes of the second lens frame 190'.

According to the present embodiment, the first hole 201' formed in the second lens frame 190' is fitted so that the first guide bar 101' does not move in the direction vertical to the optical axis in relation to the second lens frame 190', the second hole 202' is a U-shaped groove, and the third hole has a diameter larger than that of the small-diameter portion of the guide bar in which the second lens frame 190' is inserted.

Thus, even when the relative positions of the guide bars 101', 102', and 103' in a plane vertical to the optical axis are shifted slightly due to manufacturing errors, the guide bars 101', 102', and 103' are reliably inserted in the holes 201', 202', and 203' of the second lens frame 190'. That is, the guide bars 101', 102', and 103' are not constrained redundantly.

(3) Since the holes 201', 202', and 203' are formed in such a shape that the holes are formed in only minimal directions necessary for absorbing errors, the lens frame 190' held by the guide bars 101', 102', and 103' will not oscillate.

(4) Since the linear actuators 125A', 125B', and 125C' are formed in the guide bars 101', 102', and 103', respectively, it is possible to secure large driving force.

(Modifications)

The present invention is not limited to the embodiments described above, but various modifications and changes described below can be made and such modifications and changes also fall within the scope of the present invention.

(1) In the above-described embodiments, although the linear actuators 125 have the same output power, the present invention is not limited to this.

For example, the first linear actuator 125A may have higher output power than the other linear actuators. In this case, in the second embodiment, the first linear actuator 125A' only is driven when a driving load of the second lens frame 190' is small (for example, the lens is moved in a horizontal direction), and the second and third linear actuators 125B' and 125C' may also be driven when the driving load is large (for example, when the lens is moved in a vertical direction). In this case, when an attitude detecting device is provided in a camera, the number of linear actuators to be driven may be selected according to the output of the attitude detecting device.

(2) In the embodiments described above, the linear actuators 125A, 125B, and 125C that move the guide bars 101, 102, and 103 supporting the lens L2 so as to be movable in the optical axis OA direction are arranged on the image side of the supporting portion 114 supporting the guide bar 102 on the subject side. The position detecting units 127A, 127B, and 127C detecting the movement amount in the optical axis OA direction of the first guide bar 101 are arranged on the image side of the supporting portion 114A supporting the first guide bar 101 on the image side. However, the arrangement positions of the linear actuators 125A, 125B, and 125C and the position detecting units 127 are not limited to this but can be set appropriately.

(3) In the embodiments described above, although the guide bars 101, 102, and 103 have the same thickness, the present invention is not limited to this. For example, the second and third guide bars 102 and 103 may be narrower than the first guide bar 101. By using the first guide bar 101 as a main guide bar and the narrow second and third guide bars as auxiliary guide bars, it is possible to reduce weight as compared to when the three guide bars have the same thickness.

(4) In the first embodiment, although images are captured in advance using the image-capturing element 16 at a plurality of positions in the optical axis direction of the lens L2, the information on the relative position of the guide bars 101, 102, and 103 at which the lens L2 is tilted so that the optical performance of the lens barrel 100 is optimized is stored in the memory 123a of the barrel control unit 123, images may be captured using the image-capturing element 16 in a state (use state) where the lens barrel 100 is attached to the camera 10, and the tilt of the lens L2 is controlled so that the optical performance of the lens barrel 100 is optimized.

Although the embodiments and the modifications can be appropriately combined and used, the detailed description thereof is not provided because the configuration of the respective embodiments is obvious from the drawings and the description. Further, the present invention is not limited to the embodiments described above.

What is claimed is:

1. A lens barrel comprising:
   a first lens;
   a second lens different from the first lens; and
   a driving unit, which moves at least one of the first lens and the second lens in an optical axis direction, and which changes a tilt of the second lens in relation to the optical axis direction, based on a position of at least one of the first lens and the second lens in the optical axis direction.

2. The lens barrel according to claim 1, wherein the driving unit includes:
   a first driving unit that moves the first lens in the optical axis direction; and
   a second driving unit that changes a tilt of the second lens in relation to the optical axis direction.

3. The lens barrel according to claim 2, wherein:
   the second driving unit changes a tilt of the second lens in relation to the optical axis direction, based on a position of the first lens in the optical axis direction.

4. The lens barrel according to claim 2, wherein:
   the second driving unit changes a tilt of the second lens in relation to the optical axis direction, based on a position of the second lens in the optical axis direction.

5. The lens barrel according to claim 2, further comprising:
   a lens holding unit that holds the second lens; and
   a plurality of guide bars, which are provided so as to extend in the optical axis direction, and which are attached to respectively different positions of the lens holding unit; wherein
   the second driving unit drives each of the plurality of guide bars in the optical axis direction.

6. The lens barrel according to claim 5, wherein:
   the second driving unit adjusts a driving amount of each of the plurality of guide bars in the optical axis direction, thereby changing a tilt of the second lens in relation to the optical axis direction.

7. The lens barrel according to claim 6, further comprising:
   a position detecting unit that detects a position of each of the plurality of guide bars in the optical axis direction, wherein
   the second driving unit changes the tilt of the second lens, based on the position of each of the plurality of guide bars in the optical axis direction, detected by the position detecting unit.

8. The lens barrel according to claim 5, wherein:
   the lens holding unit is moved in the optical axis direction during zooming or focusing.

9. The lens barrel according to claim 5, wherein:
   the plurality of guide bars are at least three guide bars.

10. The lens barrel according to claim 9, wherein:
    three openings corresponding to the respective guide bars are provided to the lens holding unit;
    a body portion having a diameter larger than a corresponding opening, and a small-diameter portion being provided on a side of the body portion closer to a subject and being insertable into the opening, are provided to each end portion of the three guide bars;
    a stopper member having a diameter larger than the opening is attached from outside to the small-diameter portion in a state of being inserted into the opening; and
    a biasing member to bias the lens holding unit in the optical axis direction is arranged on an outer circumference of the small-diameter portion.

11. The lens barrel according to claim 10, wherein:
    a first opening of the three openings and the small-diameter portion inserted into the first opening are fitted with a minimum necessary gap;
    a second opening of the three openings is a U-shaped groove or long hole of which the opening length in a first direction that is vertical to the optical axis and extends toward the first opening is larger than an opening length in a second direction that is vertical to the optical axis and orthogonal to the first direction, and the second opening and the small-diameter portion inserted into the second opening are fitted with a minimum necessary gap in the second direction; and
    a third opening and the small-diameter portion inserted into the third opening have a sufficient gap necessary for avoiding redundant constraint.

12. The lens barrel according to claim 5, wherein:
    the second driving unit changes a driving amount of each of the plurality of guide bars in the optical axis direction, and changes a direction and an amount of tilt of the lens holding unit from a direction orthogonal to the optical axis, as a result of movement of the lens holding unit in the optical axis direction during zooming or focusing.

13. The lens barrel according to claim 5, further comprising:
    a fixed cylinder that holds the plurality of guide bars so as to be movable in the optical axis direction.

14. The lens barrel according to claim 5, wherein:
the second driving unit is a plurality of actuators provided so as to correspond to the plurality of guide bars, respectively.

15. An image-capturing device comprising the lens barrel according to claim 1.

16. A method for driving a lens barrel, comprising:
providing a first lens, providing a second lens different from the first lens, and providing a driving unit which moves at least one of the first lens and the second lens in an optical axis direction, and changes a tilt of the second lens in relation to the optical axis direction, based on a position of at least one of the first lens and the second lens in the optical axis direction.

17. The method for driving a lens barrel according to claim 16, wherein the driving unit includes:
a first driving unit that moves the first lens in the optical axis direction; and
a second driving unit that changes a tilt of the second lens in relation to the optical axis direction.

18. The method for driving a lens barrel according to claim 17, wherein
the second driving unit changes a tilt of the second lens in relation to the optical axis direction, based on a position of the first lens in the optical axis direction.

19. The method for driving a lens barrel according to claim 17, wherein
the second driving unit changes a tilt of the second lens in relation to the optical axis direction, based on a position of the second lens in the optical axis direction.

20. The method for driving a lens barrel according to claim 17, further comprising:
providing a lens holding unit that holds the second lens; and
providing a plurality of guide bars, which are provided so as to extend in the optical axis direction, and which are attached to respectively different positions of the lens holding unit, wherein the second driving unit drives each of the plurality of guide bars in the optical axis direction.

21. The method for driving a lens barrel according to claim 20, wherein:
the second driving unit adjusts a driving amount of each of the plurality of guide bars in the optical axis direction, thereby changing a tilt of the second lens in relation to the optical axis direction.

22. The method for driving a lens barrel according to claim 21, further comprising:
providing a position detecting unit that detects a position of each of the plurality of guide bars in the optical axis direction, wherein the second driving unit changes the tilt of the second lens, based on the position of each of the plurality of guide bars in the optical axis direction, detected by the position detecting unit.

23. The method for driving a lens barrel according to claim 20, wherein:
the lens holding unit is moved in the optical axis direction during zooming or focusing.

24. The method for driving a lens barrel according to claim 20, wherein:
the plurality of guide bars are at least three guide bars.

25. The method for driving a lens barrel according to claim 24, further comprising:
providing three openings corresponding to the respective guide bars to the lens holding unit;
providing a body portion having a diameter larger than a corresponding opening, and a small-diameter portion being provided on a side of the body portion closer to a subject and being insertable into the opening to each end portion of the three guide bars;
attaching a stopper member having a diameter larger than the opening from outside to the small-diameter portion in a state of being inserted into the opening;
and arranging a biasing member for biasing the lens holding unit in the optical axis direction on an outer circumference of the small-diameter portion.

26. The method for driving a lens barrel according to claim 25, wherein:
a first opening of the three openings and the small-diameter portion inserted into the first opening are fitted with a minimum necessary gap;
a second opening of the three openings is a U-shaped groove or long hole of which the opening length in a first direction that is vertical to the optical axis and extends toward the first opening is larger than an opening length in a second direction that is vertical to the optical axis and orthogonal to the first direction, and the second opening and the small-diameter portion inserted into the second opening are fitted with a minimum necessary gap in the second direction; and
a third opening and the small-diameter portion inserted into the third opening have a sufficient gap necessary for avoiding redundant constraint.

27. The method for driving a lens barrel according to claim 20, wherein:
the second driving unit changes a driving amount of each of the plurality of guide bars in the optical axis direction, and changes a direction and an amount of tilt of the lens holding unit from a direction orthogonal to the optical axis, as a result of movement of the lens holding unit in the optical axis direction during zooming or focusing.

28. The method for driving a lens barrel according to claim 20, further comprising:
providing a fixed cylinder that holds the plurality of guide bars so as to be movable in the optical axis direction.

29. The method for driving a lens barrel according to claim 20, wherein:
the second driving unit is a plurality of actuators provided so as to correspond to the plurality of guide bars, respectively.

* * * * *